United States Patent [19]

Powers

[11] Patent Number: 4,550,335
[45] Date of Patent: Oct. 29, 1985

[54] COMPATIBLE AND HIERARCHICAL DIGITAL TELEVISION SYSTEM STANDARD

[75] Inventor: Kerns H. Powers, Princeton, N.J.

[73] Assignee: RCA Corporation, Princeton, N.J.

[21] Appl. No.: 411,905

[22] Filed: Aug. 26, 1982

Related U.S. Application Data

[62] Division of Ser. No. 230,384, Feb. 2, 1981, abandoned.

[51] Int. Cl.[4] .............................................. H04N 5/02
[52] U.S. Cl. ...................................... 358/11; 358/140
[58] Field of Search ..................... 358/11.13, 140, 141, 358/143, 313, 16

[56] References Cited

U.S. PATENT DOCUMENTS

| | | | |
|---|---|---|---|
| 3,691,359 | 9/1972 | Dell et al. | 235/164 |
| 3,891,994 | 6/1975 | Phillips | 358/16 |
| 3,919,535 | 11/1975 | Vattuone | 235/164 |
| 3,984,626 | 10/1976 | Mounts et al. | 178/6 |
| 4,009,486 | 2/1977 | Thompson | 358/13 |
| 4,041,292 | 8/1977 | Kindell | 235/164 |
| 4,200,881 | 4/1980 | Carnt | 358/16 |
| 4,204,227 | 5/1980 | Gurley | 358/13 |
| 4,276,565 | 6/1981 | Dalton et al. | 358/140 |
| 4,322,739 | 3/1982 | Drewery et al. | 358/13 |

FOREIGN PATENT DOCUMENTS

| | | |
|---|---|---|
| 2814893 | 1/1979 | Fed. Rep. of Germany . |
| 1391434 | 4/1975 | United Kingdom . |
| 1413637 | 11/1975 | United Kingdom . |
| 1455822 | 11/1976 | United Kingdom . |
| 2002154 | 2/1979 | United Kingdom . |
| 2019154 | 10/1979 | United Kingdom . |
| 1567660 | 5/1980 | United Kingdom . |
| 2038138A | 7/1980 | United Kingdom . |
| 1580724 | 12/1980 | United Kingdom . |

OTHER PUBLICATIONS

A letter dtd. Jun. 27, 1980 to R. S. Hopkins from S. N. Baron describing use of 13.5 MHz, described at p. 3, lines 24-32, of the parent specification.
SMPTE Journal, vol. 85, Mar. 1976, pp. 141-145, article entitled "PCM NTSC Television Characteristics".
SMPTE Journal, vol. 88, Aug. 1979, pp. 550-554, articles entitled "Low Bit-Rate System for Digital Coding of the Television Picture".
German language Nachrichtentechische Zeitschrift (NTZ), Nov. 6, 1971, pp. 321-325, article entitled "Moglichkeiten der Farbfernsehsignaleng", (Possibilities of Digital Coding and Transmission of Color Television Signals).
A letter dtd. Oct. 8, 1980 by Frank Davidoff described at p. 3, line 32 of the specification (parent), Western Electric Technical Digest, No. 26, Apr. 1972.

Primary Examiner—Tommy P. Chin
Attorney, Agent, or Firm—Paul J. Rasmussen; William H. Meise; Peter M. Emanuel

[57] ABSTRACT

A digital television system in which signals are sampled at 13.5 MHz and produce an integer number of samples during each horizontal line interval whether the signals are based upon PAL/SECAM or NTSC standards. In order to make the digital system hierarchical and to adapt it for simple transcoding from an NTSC signal sampled at 4 times color subcarrier, the number of samples occurring during the active portion of each horizontal line is made equal to 704. Transcoding by interpolation from 4XSC—sampled NTSC video to the digital system is accomplished by selecting a particular number of samples per active line such that small blocks of samples can be transcoded independently, which allows interpolation to be achieved simply.

18 Claims, 5 Drawing Figures

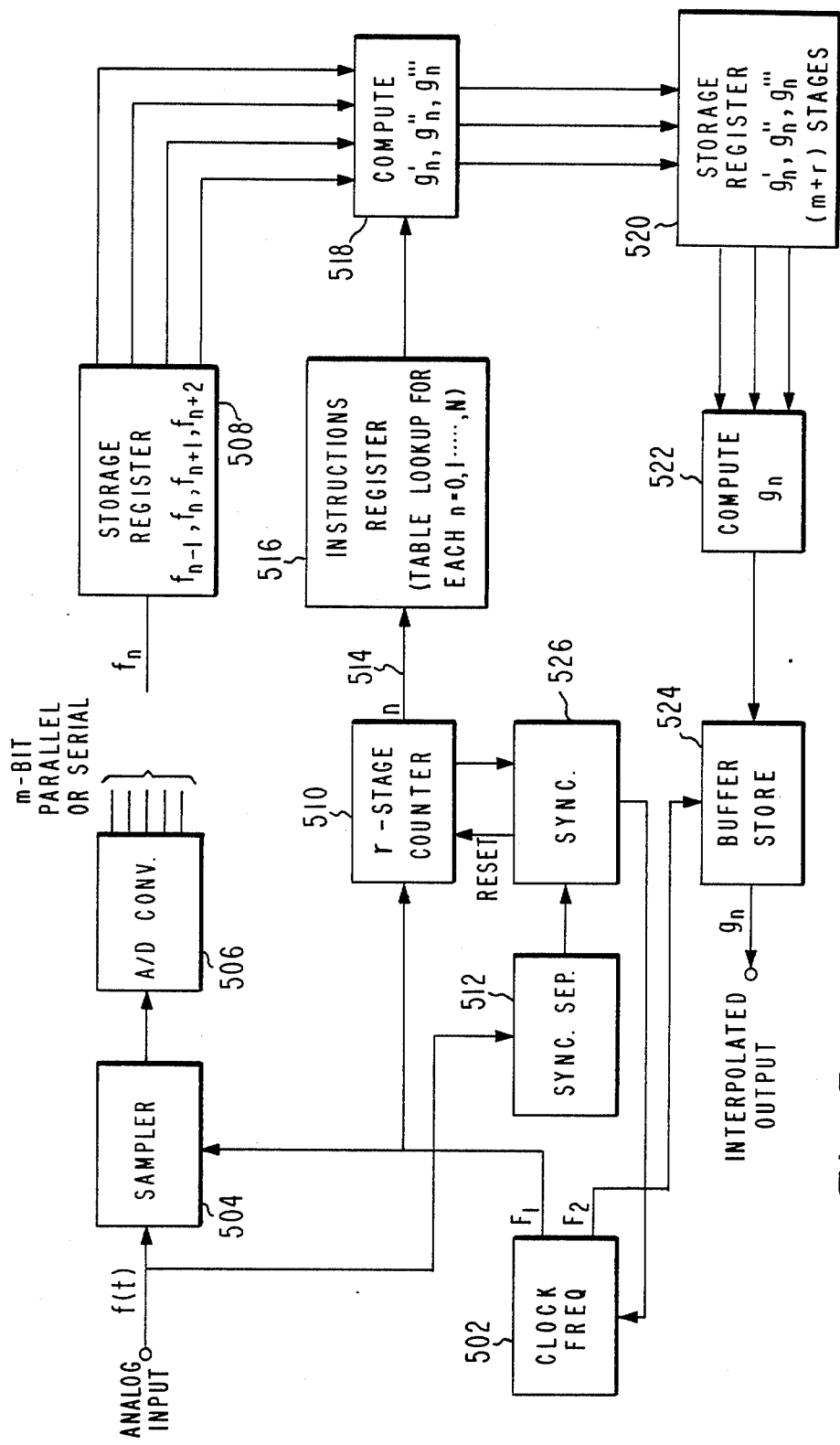
Fig. 5 SQUARE-LAW INTERPOLATOR

COMPATIBLE AND HIERARCHICAL DIGITAL TELEVISION SYSTEM STANDARD

This is a division of application Ser. No. 230,384, filed Feb. 2, 1981, now abandoned.

This invention relates to a digital television system which is compatible with the most widely-used worldwide television standards, and which is also readily transcodeable from sampled composite NTSC video, and which is capable of multiple-level hierarchies of resolution.

Various characteristics of a worldwide standard for compatible digital television have been considered. It has variously been suggested that there should be an equal number of samples during the total duration of a horizontal line in both 525-line 60-hertz (NTSC) and 625-line 50-hertz (PAL/SECAM) systems, or possibly an equal number of samples during the active portion of each line. Also among the issues relating to such a worldwide standard are the sampling frequency appropriate for limited bandwidth systems and yet having adequate resolution, and whether the standard should be a composite luminance-chrominance system as opposed to component systems such as RGB or YIQ.

It is also desirable to have a digital television standard which is hierarchical. A hierarchical system is one in which various grades or levels of detail or service can be simply transmitted, as by filtering and deleting samples. Thus, a digital system might allow for generation of signals at a very high sample rate providing resolution suitable for cinema-type use. Such a resolution might be 2000 lines per raster. Television production houses might for editing purposes wish to use a resolution greater than the standard television resolution but might wish to use equipment less costly than that capable of operating at data rates commensurate with a 2000-line raster. Thus, the television production house might use equipment capable of using the second level of the hierarchy, which is 1000-line resolution. If a tape recording originally made at the 2000-line resolution level were available to the production house, filtering and deleting alternate samples of each line would reduce the resolution to the 1000-line level. The next level in the hierarchy might be 500-line resolution, which might be used in a television broadcast station for generating analog video for transmission to homes. A tape edited by a television production house could be used by the broadcaster in equipment capable of 500-line resolution by deleting every other sample. Alternatively, the television station could use a 2000-line resolution tape by deleting 3 samples out of 4. The next step in the hierarchy might be applicable to electronic news-gathering cameras at 250-line resolution, and the next lower level of resolution might be used for surveillance purposes.

It is commonly expected that in the United States and in other countries using NTSC standards that equipment will be commonly available for processing television signals in a composite form. It is highly advantageous in such equipment to have the sampling rate an integer multiple such as 3 or 4 times the color subcarrier frequency (3XSC, 4XSC). It seems very likely that the world standard for digital television when it is ultimately adopted will not be based on a sampling rate locked to a color subcarrier. However, it is very desirable that subcarrier-locked sampled composite video be easily transcodeable to have the characteristics of the standard when that standard is adopted. In all likelihood, this transcoding will require interpolation of the values of the samples in the world standard from the values of the nearest adjacent samples of the composite NTSC video. Naturally, if the clock rates were identical, the samples would be identical and no interpolation would be necessary. Exact interpolation is complex and requires multiplications and additions for each interpolated sample. Multipliers especially tend to be slow in operation and in order to achieve operation at high video data rates they may be expected to be expensive. It would be highly desirable to have a worldwide television standard for digital video which is compatible between the 625/50 and 525/60 standards as to sampling frequency, which is hierarchical and which is also readily transcodeable from composite NTSC video sampled at a multiple of the subcarrier rate without the use of multipliers.

The original NTSC standard horizontal line frequency for monochrome television was 15,750 hertz. With the adoption of color systems the line rate was changed to be related to the sound subcarrier frequency of 4.5 MHz. The exact horizontal line rate is $1/286 \times 4.5$ MHz, which the CCIR has standardized to $15734.264 \pm 0.0003\%$ Hz. More recently, the FCC has defined the color subcarrier frequency in megahertz as the quotient 315/88, and the line rate is 2/455 times that subcarrier frequency which is approximately 15,734.266. In the 625/50 standard, the horizontal line rate is 15,625 hertz.

It is known that a common clock frequency of precisely 13.5 MHz provides exactly 864 samples per horizontal line in the 625/50 system and that it provides exactly 858 samples per line in the 525/60 system. Thus, sampling rates of 13.5 MHz (and other sampling frequencies related thereto by multiples of 2.25 MHz) provide integer numbers of samples per line in both systems.

The duration of the horizontal line in a 625/50 system is 64.00 $\mu$S, and in the 525/60 system the duration is approximately 63.56 $\mu$S. The CCIR standards for the 625/50 system provides for an active line duration of approximately 52 microseconds with a blanking duration of 12 microseconds. The blanking duration according to present NTSC color standards is $10.9 \pm 0.2$ $\mu$S, but proposals have been made for change of this standard. Thus, the blanking duration of NTSC is not clearly defined. If it is assumed that the active line duration is 525/60 is also 52 $\mu$S, the 13.5 MHz sample rate yields 702 samples for the active portion of each line. The number of samples occurring during the blanking portion, however, varies from 162 in the 625/50 system to 156 in the 525/60 system.

SUMMARY OF THE INVENTION

A processing system for television signals includes a sampler at a 13.5 MHz rate in order to provide an integer number of samples for each horizontal line when processing either 525-line-per-frame, 30 frame-per-second signals or 625-line-per-frame, 25 frame-per-second signals in order to provide ease of transcoding to either standard. In order to further facilitate transcoding with NTSC composite color signals sampled at a multiple of the color subcarrier rate and to provide a full hierarchical range, the number of samples per active line is chosen to be an integer multiple of 16 selected to provide a suitable blanking interval.

DESCRIPTION OF THE DRAWING

FIG. 5 is a functional block diagram of an embodiment of the invention involving transcoding.

DESCRIPTION OF THE INVENTION

Figure 1:
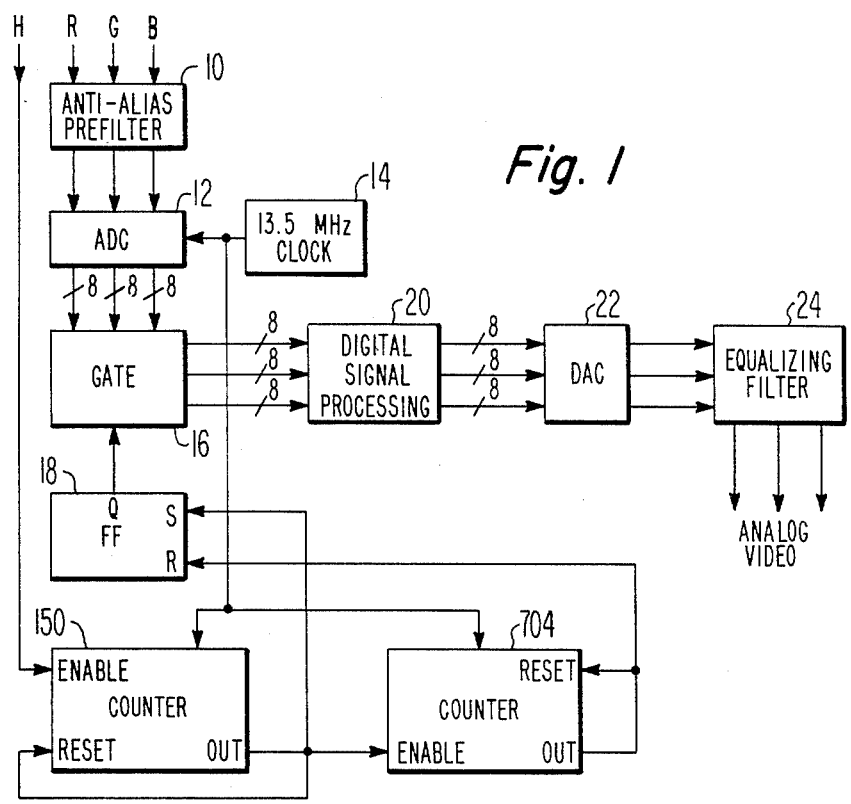
FIG. 1 is a block diagram of a television system including a digital portion in accordance with one aspect of the invention.

FIG. 1 illustrates an arrangement in accordance with the invention. In FIG. 1, analog red (R), green (G) and blue (B) signals, together with horizontal synchronizing signals (H) are provided from a source (not shown) such as a television camera. The H signal is applied to the enable input of a 150-counter 150, while the R, G and B signals on their separate lines are applied to an appropriate anti-alias prefilter 10 where the bandwidth is limited to prevent the appearance of aliases in the output signal. The band-limited R, G and B signals are applied to an analog-to-digital converter (ADC) 12 within which the separate R, G and B signals are sampled and quantized at a 13.5 MHz rate under the control of a clock signal applied thereto from a clock generator 14. ADC 12 may generate the R, G and B signals at its output terminals in the form of multiple parallel channels for each signal or as a single serial channel for each signal. In the illustrated embodiment, 8 parallel lines are used for each signal.

The signals are applied from ADC 12 to a gate 16 which can be enabled by a flip-flop 18 to allow samples to pass or which can prevent the passage of samples to further digital signal processing illustrated as a block 20. The digital signal processing 20 forms no part of the invention and is some function which it is desirable to perform in a digital mode. For example, the digital signal processing may include tape recording, tape editing, color control or blending or other special effects. Also, digital signal processing could simply be a transmission channel by which the digital signals are sent to a distant location. After signal processing, the signals need no longer be in digital form and are therefore applied to a digital-to-analog converter (DAC) 22 where quasi-analog samples are generated. The quasi-analog signals produced thereby are applied to an equalizing filter 24 for filtering or smoothing to produce appropriate analog video.

In accordance with one aspect of the invention, gate 16 is enabled to define the active line and controlled so as to allow precisely 704 samples to flow through the digital signal processor 20. The timing control required is provided by a flip-flop (FF) 18, counter 150 and counter 704. H sync signals 204 defining the beginning of each horizontal line are applied to the enable input of counter 150, to another input of which are applied 13.5 MHz clock signals 202 from generator 14. Counter 150 counts 150 clock or sample pulses, and produces at the end t150 of this time interval an output pulse which is applied to the reset input of counter 150, to the enable input terminal of counter 704 and to the set input terminal of FF 18 to cause the Q output of the FF to go high to enable gate 16 to begin to pass samples. Counter 704 begins to count at time t150 in synchronism with the samples flowing through gate 16 and when precisely 704 samples have been counted, counter 704 produces an output signal at time t854 which resets counter 704 and which is also applied to the reset input of FF 18 to reset the Q output to zero to thereby disable gate 16 and prevent the passage of further samples thus defining the end of the active interval.

Figure 2:
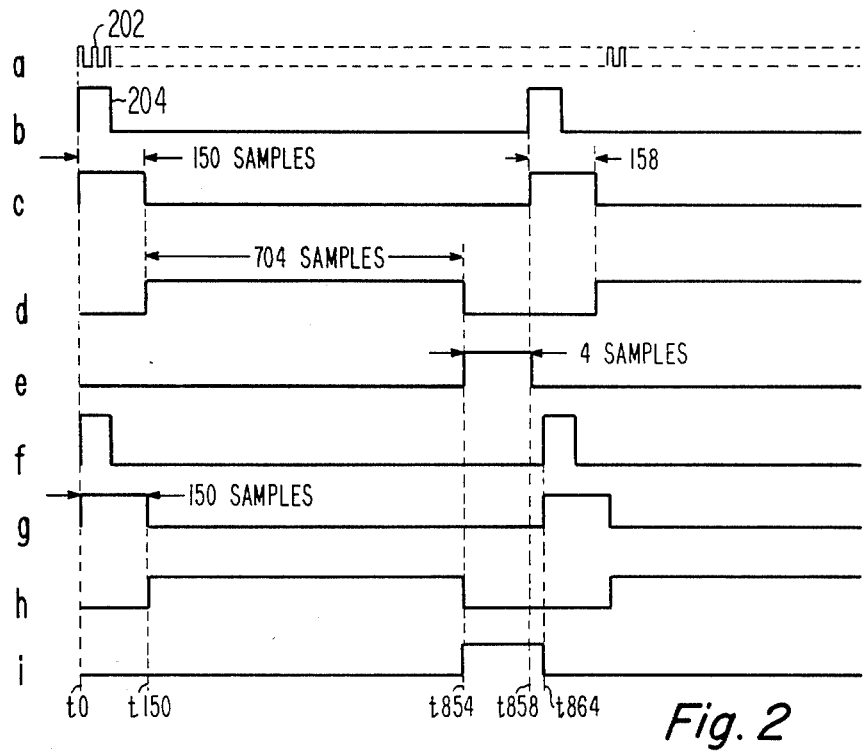
FIG. 2 illustrates timing signals useful in understanding certain aspects of the arrangement of FIG. 1.

The operation of the timing arrangement of FIG. 1 and the differences between 525/60 and 625/50 operation are more clearly shown in FIG. 2. In FIG. 2a, clock samples 202 are illustrated, not to scale. In FIG. 2b, horizontal sync pulses 204 are illustrated which are at a 15734.266 nominal rate. Beginning at time t0 corresponding to the beginning of a horizontal line, counter 150 counts until time t150 as illustrated in FIG. 2c and produces an output pulse at time t150 which begins the gating of samples through gate 16 and enables counter 704 which counts until time t854 as illustrated in FIG. 2d. FIG. 2e illustrates the remaining time until the next following horizontal sync signal which occurs beginning at time t858. The second part of the blanking interval, defined by the duration illustrated in FIG. 2e, is 4 samples. FIG. 2f illustrates horizontal sync signals occurring at a nominal rate of 15,625 hertz. The duration of count of counter 150 is illustrated in FIG. 2g and the duration of count of counter 704 is illustrated in FIG. 2h and terminates as in the first case at time t854. However, the blanking interval is now longer and extends from time t854 to time t864 at which time the next horizontal sync signal occurs to begin the cycle again.

Since the active interval in the described system is defined by 704 samples, the remainder of the interval is by definition blanking. The 150-count of counter 150 defines substantially all of the blanking interval which would occur when the system input is from a 525/60 source. With such a source, that portion of the blanking interval defined by the 150-counter is larger than that portion of the blanking interval occurring after the time t854 of resetting of counter 704 and FF 18 and the time t0 of the next following horizontal sync pulse. Thus, the first portion of the blanking interval occurs after each H sync pulse, and is defined by counter 150. The second part of the blanking interval begins after the active line and extends until the next following H sync pulse. Consequently, the duration of the second portion of the blanking interval which occurs during each line will vary depending upon the duration of a horizontal line as defined by the source standards.

The significance of the number 704 is derived from the fact that 704 is rich in powers of 2 ($704 = 2^6 \times 11$) and consequently, it can support 6 levels of hierarchy. Furthermore, 704 samples per line allows the blanking intervals for the 625/50 system to be met and is extremely close to the specified limits of the NTSC blanking interval.

The arrangement of FIG. 1 illustrates a digital signal processing system according to the invention in which the source synchronization may correspond to either a 625/50 or a 525/60 standard and in which the input signal is analog. However, in many cases it may be desirable to transcode from another digital system into the standards described in conjunction with the arrangement of FIG. 1. For example, it has been mentioned that in the United States and possibly in other countries it may be desirable to have a system of digital video in which the standard clocking rate is based upon a multiple of the subcarrier rate, such as 4XSC. As will be described, the number 704 is also advantageous in that it allows for easy transcoding between such a composite NTSC digital standard and the general or world standard described in FIG. 1.

Figure 3:
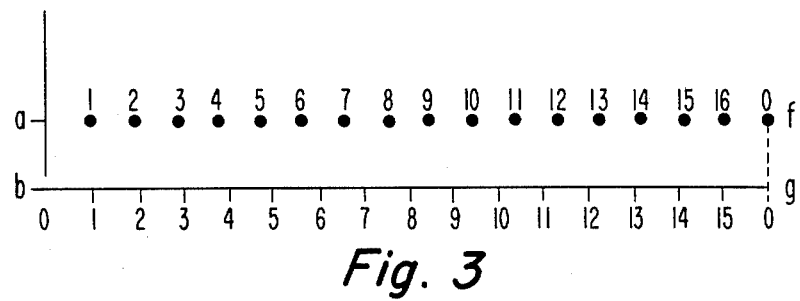
FIG. 3 is a timing diagram useful in understanding the relative sampling times when transcoding from NTSC composite color television signals to signals according to the standards of the arrangement of FIG. 1.

In a composite NTSC television signal sampled at 4XSC, 910 samples occur during each complete horizontal line. However 754 samples occur during the active portion while the remaining 156 occur during the blanking intervals. In order to accomplish transcoding according to another aspect of the invention, 748 samples per active portion of each line are required. The number 748 is chosen because it has a common factor of 44 (748=17×44) with the number of samples in the world system (704=16×44). This means that each horizontal line of either system can be divided into 44 blocks, one of which will contain 17 samples per block while the other contains 16 samples per block. FIG. 3 aids in visualizing this scheme. The horizontal axis in FIG. 3 represents time. The length of the line in FIG. 3b is 16 units long, with each mark representing a sample time. The 16 samples shown in the block of FIG. 3b correspond to one of 44 similar blocks which may occur sequentially during the active portion of a horizontal line in the world digital standard. The block of samples illustrated in FIG. 3a occupies approximately the same time duration as does the block illustrated in FIG. 3b. However, the block of samples of FIG. 3a has 17 samples rather than 16. Nevertheless, it will be understood that 44 blocks of samples such as shown in FIG. 3a will occur within the same time as 44 blocks of those shown in FIG. 3b. However, by selecting the total number of samples so that they can be divided into relatively small blocks, the amoung of signal processing necessary for transcoding may be much reduced. Assuming that digital signals are available sampled at the rate illustrated in FIG. 3a, it will be apparent that to generate a signal according to the clocking system of FIG. 3b some interpolation will be required. For example, the seventh sample in FIG. 3b lies approximately half-way between the seventh and eighth samples in FIG. 3a. Consequently, the value of the seventh 3b sample can be approximated by the average of the values of the signal at the seventh and eighth sample points of the incoming signal clocked as in 3a. Similarly, the second sample (sample number one) of FIG. 3b lies very close to the second sample (sample number one) in FIG. 3a, and its value may be estimated to be equal to the signal value at sample 1 of FIG. 3a plus 1/16th of the difference between the values at sample number one and two. Generally speaking, the value $g_n'$ of the nth linear interpolated output sample is determined by $$g_n' = f_n + \frac{n}{16}(f_{n+1} - f_n) \quad (1)$$

where n may range from 0 to 16 and represents the sample number of the new samples being generated. The transcoding aspect of the invention uses the fact that the factor 17/16 is the ratio of small integers, and that the denominator of the ratio is a power of 2.

Figure 4:
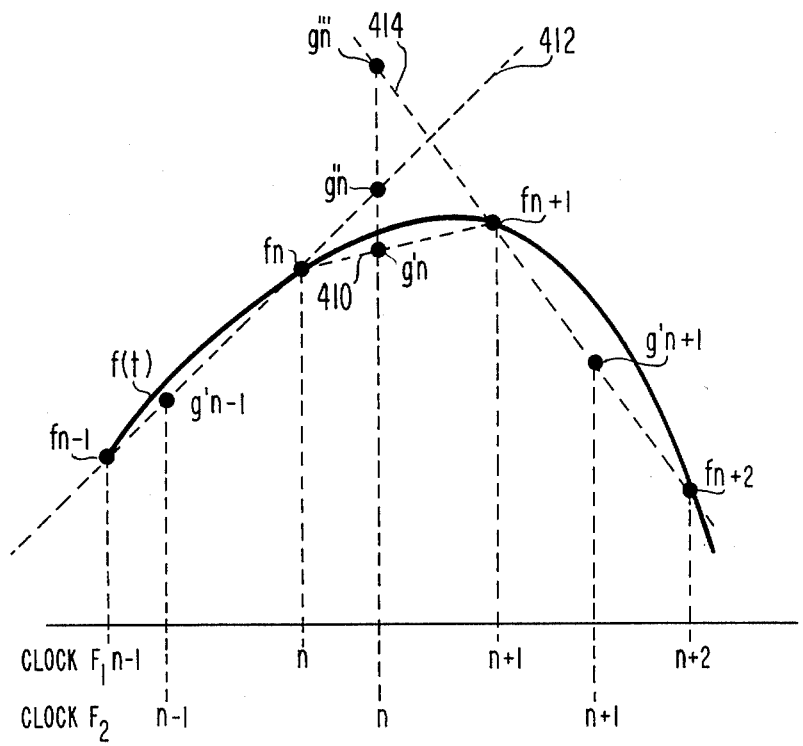
FIG. 4 illustrates a generalized waveform aiding in understanding the errors arising upon transcoding by interpolation at the new sample points of the values of the signal as originally sampled.

In accordance with the waveform f(t) of FIG. 4, let $f_n$ be the sequence of sample values at the rate of 4XSC which is frequency $F_1$. The straight lines connecting successive sample values represent a linear approximation to the analog waveform f(t), and the samples marked $g_n'$ represent interpolated samples at the clock rate of 13.5 MHz ($F_2$). The operation defined by equation 1 consists of two additions and one multiplication. One of the factors in the multiplication is the fraction n/16 where n is a small integer. Although multiplication of binary numbers is a complex and time consuming operation, division by two is readily accomplished by moving one bit in a shift register. Any binary number, e.g., 234=11101010 can be divided by two simply by adding a zero ahead of the most significant digit. The result becomes 01110101=117 which is precisely half of the previous number to 9-bit accuracy for an 8-bit original quantization. Thus, multiplication of a sample value by a multiplying factor, say 7/16, can be accomplished by dividing the original sample value S four successive times by the integer 2 to get respectively 8/16S, 4/16S, 2/16S, and 1/16S of the original sample value. Then 7/16 times the value is obtained by adding the values obtained for 4/16S+2/16S+1/16S in two successive additions. Thus, any number in digital form can be multiplied by the factor n/16 by four successive shifts and up to three successive adds. This technique can be generalized to any multiplying factor $n/2^r$ for any integer r.

Linear approximation by the preceding technique may create errors in the interpolation process. The error in FIG. 4 is equivalent to the difference between the value of the curving waveform f(t) at the time n of the sample point $g_n'$ and the point on the straight line 410 between $f_{n+1}$ and $f_n$. This error can be small especially when the interpolated result is quantized to the same number of levels as the input waveform. The errors tend to be largest at points of maximum concavity in the incoming waveform and are in the direction toward the inside of the concavity. Such errors do not occur in flat (constant level) regions of the picture or in linearly changing regions but occur only in the vicinity of changing slope (concave down or concave up). Thus interpolation errors will occur only in regions of high definition or rapidly changing edges. The subjective effect of the error is to reduce the concavity, or to soften the picture edges.

The interpolation error resulting from concavities in the analog approximation f(t) from which the original sample values $f_n$ were derived can be significantly reduced by using information drawn from more of the surrounding points, as by using three or four samples instead of two. This is accomplished by using the extensions 412 and 414 of the straight-line approximations formed between sample points $f_{n-1}$ and $f_n$ and between $f_{n+1}$ and $f_{n+2}$, respectively. Realizing that the time of occurrence n of new samples $g_n'$ at the $F_2$ clock rate can occur very near the time of sample $f_n$ at the beginning of a block of samples, or very near the time of sample $f_{n+1}$ near the end of a block of samples, it will be apparent that the weight to be given to approximations $g_n''$ or $g_n'''$ in determining the actual value $g_n$ of the new sample at time n will depend upon the proximity in time of sample $g_n$ to either sample $f_n$ or $f_{n+1}$. It should be noted from FIGS. 3 and 4 that each new sample value $g_n$ within a block of samples is related one-to-one to an existing sample $f_n$, and consequently the numbering of new samples $g_n$ as shown in FIG. 4 corresponds to the numbering of old or incoming samples $f_n$.

The value of $g_n''$ equals the known value of sample $f_n$ plus an incremental portion of the difference between samples $f_n$ and $f_{n-1}$, because that incremental portion is the same whether it is between n−1 and n or between n and n+1. Thus $$g_n'' = f_n + \frac{n}{16}(f_n - f_{n-1}) \quad (2)$$

Similarly, the value of $g'''_n$ on extension 414 can be determined by adding to the known value of $f_{n+1}$ the difference in sample values between $f_{n+1}$ and $f_{n+2}$ multiplied by one minus the incremental portion used to determine $g''_n$, and $$g_n''' = f_{n+1} + \frac{16-n}{16}(f_{n+1} - f_{n+2}) \quad (3)$$

It will be apparent that when new sample $g_n$ is near the time of $f_n$, the value of $g''_n$ can be added with some weighting to the value determined for $g'_n$ in order to form an approximation, and when $g_n$ is near the time of $f_{n+1}$, the value of $g'''_n$ can be added with a weighting to the value of $g'_n$.

A good approximation for the new sample value $g_n$ when $g_n$ is nearer $f_n$ (when n=0, 1, ... 7) is $$g_n = \frac{16-n}{16} g_n'' + \frac{n}{16} g_n' \quad (4)$$

and when $g_n$ is nearer $f_{n+1}$ (when n=9, 10, 11, ... 15)

$$g_n = \frac{n}{16} g_n''' + \frac{16-n}{16} g_n' \quad (5)$$

For n=8, the results $g_n$ from equations (4) and (5) are averaged to get $$g_8 = \frac{1}{2}(\frac{1}{2}g''_8 + \frac{1}{2}g'''_8 + g'_8) \quad (6)$$

It will be noted that equations (4), (5) and (6) are sums of products, where the products are of the form (K/16)g. Consequently, the square-law or parabolic approximations $g_n$ of function f(t) can be accomplished by successive divide-by-two and summing operations, as in the case of linear interpolation.

Because of the concavity of f(t) below a straight-line tangent to f(t) at point $f_n$, the interpolated value of $g_n$ between $g'_n$ and $g''_n$ near the center of the interval between n and n+1 is likely to be slightly greater than the actual value of f(t) before it was sampled to produce values $f_n$. Thus, the errors made in the described square-law interpolation process are in a direction which tends to enhance changes, which will have the subjective effect of enhancing transitions or edges in the television picture.

FIG. 5 illustrates an arrangement for performing a square-law interpolation in accordance with the described process. In FIG. 5, the clock frequencies $F_1$ and $F_2$ generated by clock generator 502 are related by $$\frac{F_1}{F_2} = \frac{2^r + 1}{2^r} \quad (7)$$

which as described yields the desirable ability to divide the sample times in each line into interpolation blocks or groups with coincident samples at either end. Composite analog color television signals f(t) are applied to a sampler 504 which recurrently samples the incoming analog signal and holds the samples for a duration sufficient for ADC 506 to quantize the samples into M bits per sample. As known, the M bits may occur simultaneously or parallel lines or serially on a single line. Each sample of M bits represents one sample value $f_n$. The various samples $f_n$ (such as $f_{n-1}$, $f_n$, $f_{n+1}$, $f_{n+2}$) are stored in succession in a register 508 where they become available so that the various approximations $g'_n$, $g''_n$, $g'''_n$ and ultimately $g_n$ can be calculated.

Synchronization of the various calculations with the blocks of samples is accomplished by horizontal sync signals derived by separator 512 from the analog input signal f(t). The separated sync signals include H sync, blanking, reconstituted color subcarrier and the like. The sync signals are applied to a synchronizer illustrated as a block 526, which transmits a signal related to the color subcarrier to clock signal generator 502 to lock the frequency of sampling clock $F_1$ to 4XSC. Sync block 526 also receives a signal indicative of a full count of N from an r-stage counter 510 for resetting the counter. Sync block 526 also delays enabling of counter 510 until the beginning of the active portion of each horizontal line. In the arrangement of FIG. 5, it has been assumed that the sample rates have been selected as described previously in conjunction with the world digital standard for each of transcoding by interpolation from a sample rate related to 4XSC, so the number r in equation (7) is known and may be for example a value such as r=4 yielding recurrent interpolation blocks of length of 16 new samples $g_n$ and 17 old samples $f_n$. Counter 510 is coupled to receive start-of-block signals from synchronizer 526 and recurrently counts $F_1$ clock pulses and produces on a line 514 a parallel digital signal representing the current value of n, which in the example may range from a value of 0 to a value of 15. Counter 510 is also reset to zero as mentioned by synchronizer 526 after each cyclic full count of n=N. The current value of n on conductor 514 is applied to a lookup table 516 which is addressed by the signal on line 514. At each memory location, information is stored as to which samples near $f_n$ are to be used for calculation for the particular value of n. This information is coupled to a computation processor 518 in which are calculated $g'_n$, $g''_n$ and $g'''_n$ as determined by stored instructions in table 516 for the value of n in accordance with the equations (1), (2) and (3). These calculations are performed, as described, by successive division by 2 of the various values $f_n$ and summing of the results of the various divisions according to the stored instructions.

Errors due to rounding-off can be minimized by performing the shifting to accomplish divide-by-two and the additions in shift registers having (M+r) bits. The values of $g'_n$, $g''_n$ and $g'''_n$ computed in 518 are successively loaded into a storage register 520 and are made available to a further computation circuit 522 where the value of $g_n$ is calculated in accordance with instructions from register 516 for the particular value of n for implementing equations (4), (5) and (6). After computation of $g_n$, the least significant bits are dropped to return to an M-bit output and loaded into a buffer 524. The interpolated signals are clocked out of buffer 524 at frequency $F_2$ and form the transcoded signal.

It will be apparent to those skilled in the art that the component system for a world standard may use YIQ; Y, (B-Y), (R-Y) or other components rather than RGB as illustrated. Also, it will be apparent that the duration of the blanking interval defined by counter 150 may be adjusted to the desired duration and position relative to sync.

What is claimed is:

1. A television signal sampling system, comprising:
   clock signal generating means for generating 13.5 MHz clock signals;
   a source of television signals, said television signals being organized into recurrent horizontal lines, each of said horizontal lines having a horizontal line interval including an active portion in which video information is carried and a non-active portion, and also including horizontal synchronizing information in said non-active portion;
   means coupled to said clock signal generating means and to said source of television signals for sampling said television signal; and
   selecting means for selecting a fixed number of samples from horizontal lines of said television signals, wherein said fixed number of samples are from that portion of said television signal occurring during said active portion of said horizontal line interval but not including samples occurring after the beginning of said horizontal synchronizing information in said non-active portion of a given horizontal line, and wherein said fixed number is an integer multiple of 16.

2. A system according to claim 1, wherein said source of television signals is a source of baseband televison signals.

3. A system according to claim 1 wherein said selecting means comprises controllable gate means.

4. A system according to claim 3 wherein said selecting means further comprises counting means coupled to said controllable gate means for limiting the number of samples from said television signals to said fixed number.

5. A digital television signal processing system, comprising:
   signal processing means for digitally processing a television signal, said television signal being organized in a plurality of horizontal lines each having an active portion containing picture information and a non-active portion containing a horizontal synchronizing pulse, to include, for each one of said horizontal lines of said television signal, a fixed number N of samples from said active portion but to not include samples occurring after the beginning of said horizontal synchronizing pulse in said non-active portion, said signal processing means operating at a rate of 13.5 MHz, wherein N is an integer multiple of 16.

6. A digital television signal processing system, comprising:
   a source of a television signal organized in a plurality of horizontal lines each having an active portion containing picture information and a non-active portion containing a horizontal synchronizing pulse;
   digital signal processing means coupled to said source of said television signal for processing, for each one of said horizontal lines of said television signal, a fixed number of samples from said active portion excluding samples occurring after the beginning of said horizontal synchronizing pulse in said non active portion, wherein said fixed number is an integer multiple of 16; and
   clock signal generating means coupled to said signal processing means for operating said signal processing means at a sampling rate of 13.5 MHz.

7. A system according to claim 6 wherein said integer is 44 whereby said integer multiple of 16 is 704.

8. A system according to claim 6 wherein said digital signal processing means comprises controlled gate means for, for each one of said horizontal lines of said television signal, excluding a particular number of samples occurring after the beginning of said horizontal synchronizing pulse in said non-active portion and for including said fixed number of samples from said active portion.

9. A digital color television transmission arrangement adapted for convenient transcoding with a standard color television video signal sampled at a rate which is the product of a first integer and the rate of the color subcarrier of said standard television video signal to thereby form a sampled television video signal, said arrangement comprising:
   selecting means for selecting M samples in the active portion of each horizontal line of said sampled television video signal, where M is the multiplicative product of the integer 17 times an integer Q, and said integer Q has a value selected to establish a predetermined relationship between the duration of the active portion to the duration of the non-active portion of each horizontal line of said sampled television video signal;
   clock signal generating means for generating 13.5 MHz clock signals for clocking said digital transmission arrangement whereby an even number N of said clock signals occurs during each interval of said M samples, where N is the multiplicative product of P times Q, P is a first integer power of 2, and the difference D between P and said integer 17 is a second integer.

10. A arrangement according to claim 9 in which D is unity.

11. A arrangement as defined in claim 9 wherein said first small integer is 4 whereby the rate of said M samples is four times the rate of the color subcarrier of said standard color television video signal.

12. A arrangement as in claim 11 wherein said standard color television video signal is a composite video signal.

13. An arrangment according to claim 11, wherein M is 748 and Q is 44.

14. A receiver for digital television signals sampled at 13.5 MHz, said receiver comprising:
   digital signal processing means for processing said digital television signals in a format having an even number N of active samples per horizontal line, wherein N is the multiplicative product of P times Q, P is an integer power of two and Q is an integer having the value 44; and
   digital-to-analog conversion means coupled to the output of said digital signal processing means for generating an analog television signal.

15. A digital color television signal transmission arrangement adapted for convenient transcoding with a color television video signal sampled at a rate which is the product of a first integer and the rate of the color subcarrier of said color television video signal, said arrangement comprising:
   selecting means for producing M samples from the active portion of each horizontal line of said color television video signal, where M is the multiplicative product of an odd integer times an integer Q, said integer Q having a value selected to establish a predetermined relationship between the duration of the active and non-active portions of each horizontal line of said digital color television signal;

clock signal generating means coupled to said selecting means for generating a 13.5 MHz clock signal for clocking said digital transmission arrangement whereby an even number N of said clock signals occur during each interval of said M samples, where N is the multiplicative product of the integer 16 times said integer Q.

16. An arrangement according to claim 15 wherein Q is 44, N is 704, M is 748 and said odd integer is 17.

17. A sampled television signal processing system for processing a television signal organized in a plurality of horizontal lines each having an active portion containing picture information and a non-active portion, comprising:
   clock signal generating means for generating a clock signal at a clock frequency of 13.5 MHz;
   sample producing means coupled to said clock signal generating means for producing samples of said televison signal at said clock frequency; and
   selecting means coupled to said sample producing means and said clock signal generating means for for selecting samples of said television singal in response to said clock signal to produce an output sampled television signal in which the number of samples in the active portion of each horizontal line is equal to 704.

18. A sampled television signal processing system for processing a television signal organized in a plurality of horizontal lines each having an active portion containing picture information and a non-active portion comprising:
   clock signal generating means for generating a clock signal at a frequency of 13.5 MHz plus or minus integer multiples of 2.25 MHz;
   sample producing means coupled to said clock signal generating means for producing samples of said television signal at said clock frequency; and
   selecting means coupled to said sample producing means and said clock signal generating means for for selecting samples of said television signal in response to said clock signal to produce an output sampled television signal in which the number of samples in the active portion of each horizontal line is equal to an integer multiple of 16.

* * * * *